(12) United States Patent
Weinreich et al.

(10) Patent No.: US 6,173,942 B1
(45) Date of Patent: Jan. 16, 2001

(54) ELECTRIC FENCE NETWORK

(75) Inventors: Wilhelm Weinreich; Robert Müller, both of Korbach (DE)

(73) Assignee: Horzont Geratewerk GmbH, Korbach (DE)

( * ) Notice: Under 35 U.S.C. 154(b), the term of this patent shall be extended for 0 days.

(21) Appl. No.: 09/212,229

(22) Filed: Dec. 16, 1998

(30) Foreign Application Priority Data

Dec. 16, 1997 (DE) .......................................... 297 22 161 U

(51) Int. Cl.⁷ ........................................................ A01K 3/00
(52) U.S. Cl. ............................. 256/10; 174/161 F; 265/33
(58) Field of Search ................................... 256/10, 33, 1; 174/161 F, 163 F, 158 F, 171, 168; 119/220, 721, 720, DIG. 908, 518; 109/31, 38, 39, 40, 41, 42, 43, 44

(56) References Cited

U.S. PATENT DOCUMENTS

| | | | |
|---|---|---|---|
| 317,908 | * | 5/1885 | Willianson .................................. 256/1 |
| 319,300 | * | 6/1885 | Morton ...................................... 256/1 |
| 401,095 | * | 4/1889 | Wood ......................................... 256/1 |
| 768,077 | * | 8/1904 | Reynolds et al. .......................... 256/1 |
| 2,172,050 | * | 9/1939 | Mayberry ................................. 256/10 |
| 2,530,247 | * | 11/1950 | Koonz ..................................... 256/10 |
| 4,196,890 | * | 4/1980 | Einhorn .................................... 256/2 |
| 4,493,480 | | 1/1985 | Nichol . | 
| 6,036,175 | * | 3/2000 | Harper ..................................... 256/1 |

FOREIGN PATENT DOCUMENTS

| | | |
|---|---|---|
| 231466 | 5/1991 | (NZ) . |
| 241302 | 9/1995 | (NZ) . |
| WO 95/01720 | 1/1995 | (WO) . |

* cited by examiner

Primary Examiner—Lynne H. Browne
Assistant Examiner—Kenneth Thompson
(74) Attorney, Agent, or Firm—Akin, Gump, Strauss, Hauer & Feld, L.L.P.

(57) ABSTRACT

Electric fences consist typically of branches, preferably running horizontally and vertically, connected to each other in the form of a network, with conductor branches made of a non-conducting material and provided with an electrical conductor or constructed directly as an electrical conductor. The conductor is connectable to the voltage conducting post of an electric fence device. In the prior art all horizontal branches are provided with an electrical conductor. This entails problems for the confinement efficacy, since in the case of fouling by growth encrustation, a large portion of the electrical energy can be lost or leak to the ground. To construct the electric fence in such a way that the loss or leakage of electrical energy into the ground is prevented as much as possible, only a few of the horizontal branches are constructed as conductor branches having relatively high electrical conductivity, and the other horizontal branches are constructed as non-conductor branches. On the horizontal conductor branches vertical conductor branches are respectively connected at predetermined intervals as stub cables.

12 Claims, 3 Drawing Sheets

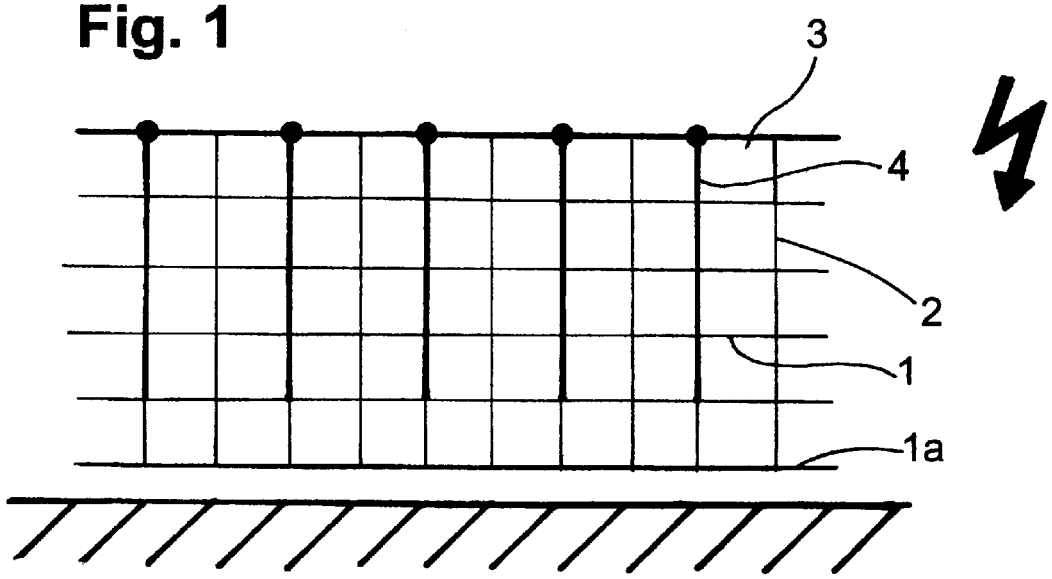
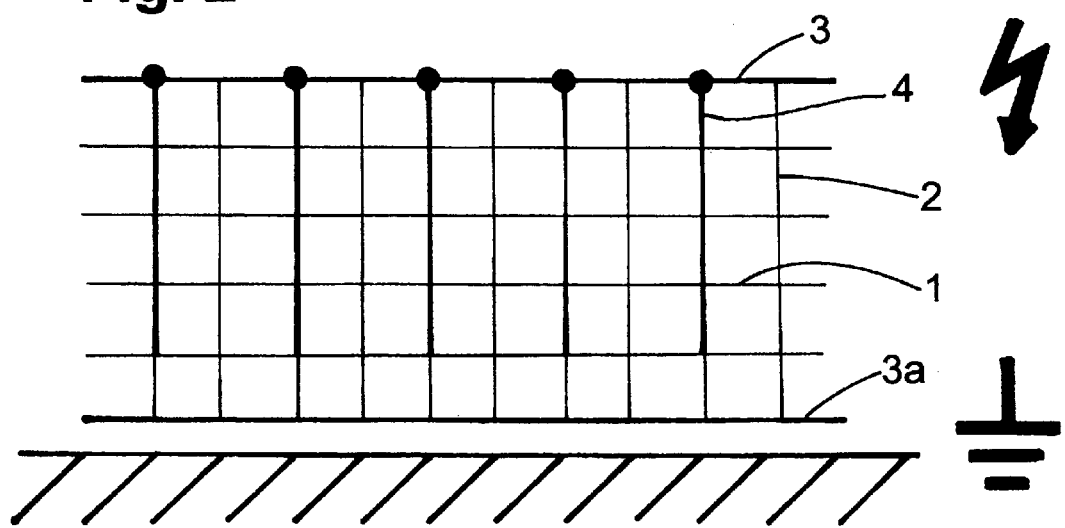

ELECTRIC FENCE NETWORK

BACKGROUND OF THE INVENTION

The invention involves an electric fence network, consisting of branches, preferably running horizontally and vertically, connected to each other in the form of a network. The branches are made of a non-conducting material and are provided with an electrical conductor. Alternatively, the branches may be constructed directly as an electrical conductor. The conductor can be connected to a voltage-conducting terminal (post) of an electric fence device.

Network-like electric fences of this type, are constructed with various grid widths, preferably to confine sheep, chickens, rabbits, pigs, and other small animals.

In the prior art all horizontal branches, possibly with the exception of the lowest branch, are provided with an electrical conductor, in particular as a twisted cable, or are directly constructed as such, so that the individual conductors, connected in parallel, can be connected to the voltage-conducting post of an electric fence device. In order to have an especially effective grounding, it is also known therein to twist the lowest branch with an electrical conductor that functions as a ground conductor.

A problem with this construction according to the prior art is that with severe fouling by growth encrustation or with a deep snow cover, the voltage in the electric fence drops sharply. Thus, it is not infrequent that on account of the growth encrustation or the electrical conduction across the snow cover, a voltage impulse of, for example, 9000V will only have available a voltage impulse of 3500V on the spot for a confinement effect.

From European patent publication EP 0 610 490, an electric fence is already known consisting of a network of non-conducting branches, which are connected to each other in a relatively complex manner. This network is passed through in a wave-like manner by at least two electrical conductors of high electrical conductivity, which are phase-shifted by 180°. This known network has a complex construction, which makes its manufacture expensive, and furthermore, the distribution of the voltage-conducting conductor is not optimal.

SUMMARY OF THE INVENTION

Based on this background, an object of the present invention is thus to construct the electric fence described at the outset in such a way that loss or leakage of electric energy into the ground is prevented as much as possible.

The achievement of this object occurs according to the present invention, wherein only a predetermined number (e.g., a minority) of the horizontal branches are constructed as conductor branches having relatively high conductivity and the other horizontal branches (e.g., a majority) are constructed as non-conductor branches, wherein on the horizontal conductor branches, vertical conductor branches are respectively connected at predetermined intervals as stub cables.

Through the horizontal conductor branches having relatively high conductivity and connecting to the voltage-conducting post of the electric fence device, like a ring circuit or busbar, practically no noticeable voltage drop occurs over the length of the fence, i.e. the electric potential is essentially equal at the points at which the respective stub cables connect. Since the length of the vertical conductor branches connected as stub cables is relatively short, because of the relatively low fence height compared to the fence length, the effect of a possible lower conductivity becomes practically unnoticeable and the voltage drop is only slight.

An especially cost-effective construction, because of its simplicity, can be obtained according to a further embodiment of the invention, if only the horizontal branch that is furthest from ground is constructed as a conductor branch having a high conductivity and the stub cable conductor branches extend essentially across the fence height at a sufficient distance from the ground to maintain insulation.

It is alternatively also conceivable that according to another embodiment of the invention, only a middle horizontal branch is constructed as a conductor branch having high conductivity and the stub cable conductor branches extend both towards the ground as well as away from the ground.

Both embodiments require only one single expensive high conductivity, which extends preferably as a ring circuit or busbar over the entire fence length. Both embodiments are thus very cost-effective.

Fundamentally, depending on the application, more than one horizontal conductor branch having relatively high conductivity can also be provided. Thus, it is conceivable according to another embodiment of the invention, that two spaced, horizontal branches are each constructed as conductor branches having high conductivity, and the stub cable conductor branches, connected to both horizontal conductor branches, extend essentially across the height of the fence, while maintaining the insulation by a sufficient spacing from the ground.

An embodiment of this type makes it possible, in particular, to use stub cable conductor branches that have a relatively high specific resistance.

In order to provide an effective electrical grounding, the electric fence according to a further embodiment of the invention is constructed in such a way that, in addition, the horizontal branch near the ground is constructed as a conductor branch having high conductivity, that is connectable to the ground as a ring circuit.

Especially effective in the area is thus the electrical grounding, if according to a further embodiment of the invention, vertical conductor branches, which lie interspersed between the vertical conductor stub cable branches and likewise have a low conductivity, are connected as stub cables at predetermined intervals to the groundable horizontal conductor branch.

Particularly advantageous is an embodiment in which the vertical conductor branches have a substantially lower electrical conductivity than the S horizontal conductor branches. The background for this is that conductors with a higher electrical conductivity on the order of magnitude of 0.1 ohm/meter, which are preferably used in the form of stranded conductors, are comparatively more expensive than conductors with lower electrical conductivities, by up to a factor of 10. Owing to the present cost pressure caused by international competition, this is a considerable cost factor.

A lower electrical conductivity of the vertical conductor branches is noticeable, however, with advantages not only in terms of cost. It also causes a smaller loss or leakage of energy into the ground in case of fouling by growth encrustation or by contact with a snow cover.

It is preferable, because it is especially cost-effective and nevertheless completely effective, if according to an embodiment of the invention, the specific resistance of the horizontal conductor branches lies in the range of 0.1–0.5 ohm/m and the specific resistance of the vertical stub cable conductor branches lies in the range of 1–50 ohm/m.

It is, however, expressly emphasized that the object of the present invention is achieved even with a network-like electric fence in which the difference between the electrical conductivity of the horizontal conductor(s) and the electrical conductivity of the vertical stub cables is zero or very small.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings:

FIG. 1 is an embodiment of the electric fence according to the invention in which an uppermost horizontal branch is twisted with a conductor having a high conductivity and which functions as a ring circuit or busbar for stub cable conductors that are branching off the uppermost horizontal branch;

FIG. 2 is an embodiment according to FIG. 1, having a ground conductor;

DETAILED DESCRIPTION OF THE INVENTION

Figure 3:
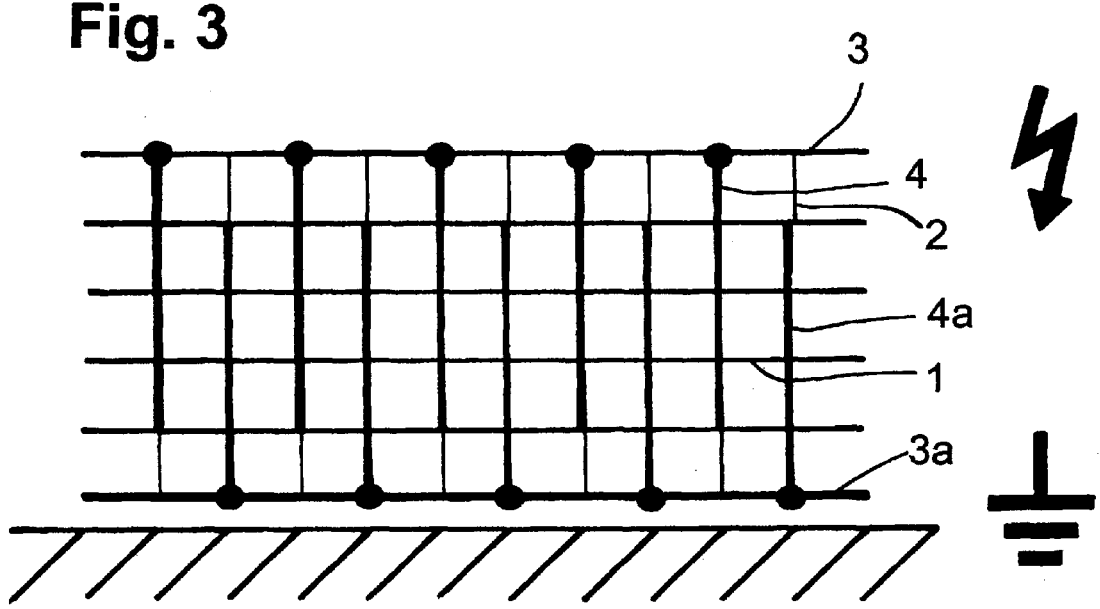
FIG. 3 is an embodiment according to FIG. 2, in which in addition vertical conductor branches, which dovetail with the voltage-conductor stub cable branches like a comb branch off from the ground conductor.

FIG. 1 shows in a schematic representation a section of an electric fence, consisting of horizontal branches 1 and vertical branches 2, connected to each other as a grid network and preferably made of plastic, where for the sake of simple representation in FIG. 1, only one branch of each is provided with a reference numeral.

In order to reinforce the electric fence network, the vertical branches preferably at least a part of them, are constructed as rigid plastic branches. The horizontal branches 1 are preferably made out of plastic fibers that are twisted together with a flexible conductor, like a strand conductor. The vertical branches 2 can also be made of a stranded conductor of this type. The horizontal branches 1, like the vertical branches 2, which are constructed as electrically conducting, can also be made of a metallic wire or strip or a stranded wire or stranded strip.

In the embodiment according to FIG. 1, only the uppermost horizontal branch, i.e. the branch that is the furthest from the ground, is twisted with an electrical conductor 3 having high conductivity which can be connected as a ring-circuit or busbar to a voltage-conducting post (not shown) of an electric fence device. Additional electrical conductors (stub cables) 4, which have a substantially lower conductivity compared to the electrical conductor 3, are mounted onto the electrical conductor 3 at certain intervals as shown in FIG. 1, at every second vertical branch 2. The stub conductors 4 are preferably twisted with the vertical branches 2 and extend essentially across the height of the fence, with the exception of the lowermost horizontal branch 1a, which is, so to speak, kept open for the ground conductor 3a as depicted in FIG. 2. For a rigid vertical branch 2, the vertical branch 2 is wrapped with a conductor. In order to maintain insulation, a sufficient spacing from the ground is maintained in regard to the extension of the vertical conductor branch toward the ground.

Through the electrical conductor 3 with high conductivity, that can be connected onto the voltage-conducting post as a ring-circuit, there is practically no observable voltage loss over the length of the fence, i.e. the electric potential is essentially equal at those points at which the respective stub cable conductors 4 are connected. Since the length of the stub cable connected conductors 4 is relatively short, due to the relatively small height of the fence in comparison to the fence length, the lower conductivity of the stub cable conductor is itself in turn practically unnoticeable, since the voltage drop is only slight. The lower conductivity of the stub cable conductor 4 also causes a smaller energy loss into the ground, in case of fouling by growth encrustation.

FIG. 2 shows an electric fence corresponding to FIG. 1, in which however, in addition, the horizontal branch 1a that is near the ground is twisted with an electrical conductor 3a having high conductivity, and which can be connected to ground like a ring-circuit. An especially effective grounding thereby results.

FIG. 3 shows an embodiment of an electric fence according to the invention corresponding FIG. 2, in which there are connected at predetermined intervals to the ring-circuit ground conductor 3a additional electrical conductors 4a, which are likewise twisted with the vertical branches 2, and which lie dovetailed like a comb between the vertical branches 2 which are twisted with the voltage-conducting stub cables 4, wherein the conductors 4a likewise have a lower conductivity than the ground conductor.

Figure 4:
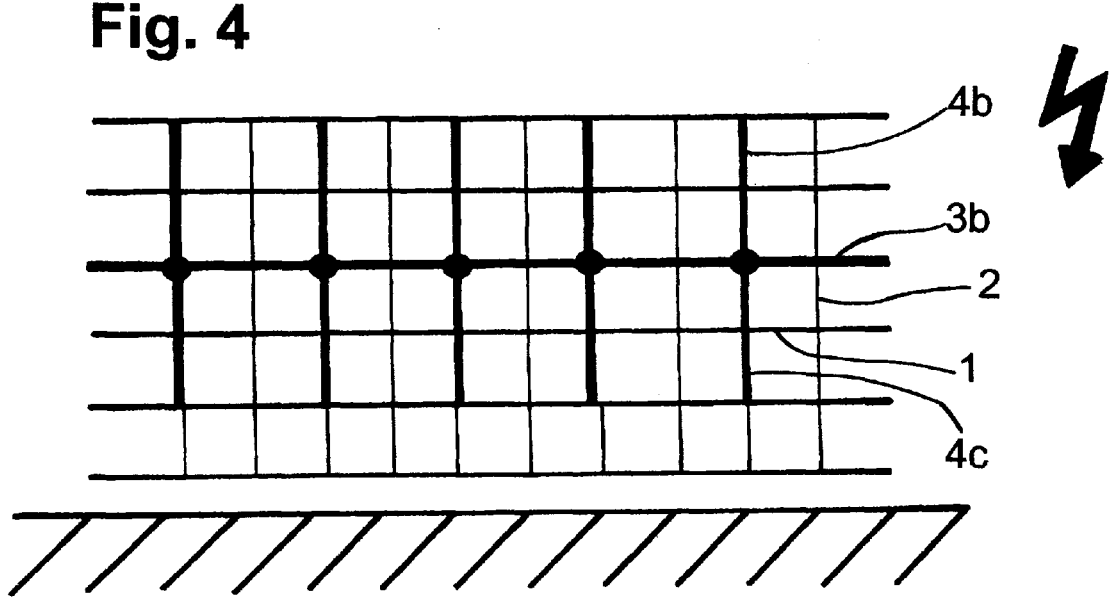
FIG. 4 is an embodiment in which a middle horizontal branch is twisted with the conductor having high conductivity, from which vertical stub cables branch off to both sides.

FIG. 4 shows an embodiment of an electric fence, in which only the middle horizontal branch is twisted with the electrical conductor 3b of high conductivity, wherein the conductors 4b and 4c connected to it like stub cables extend both toward the ground and away from the ground. In this embodiment according to FIG. 4, the voltage drop across the stub cable conductors 4b and 4c is smaller than in the case of the embodiment according to FIGS. 1 to 3, making it possible to use a conductor with even lower conductivity for the stub cable conductors 4b and 4c.

Also for the embodiment according to FIG. 4, an effective grounding having an additional ground conductor corresponding to FIG. 2 is possible.

Figure 5:
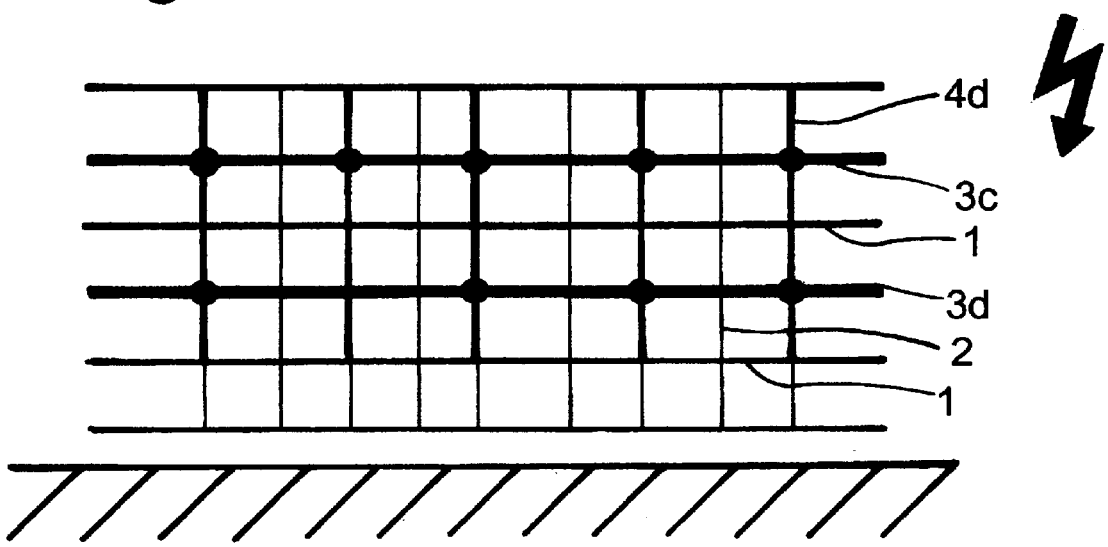
FIG. 5 is an additional embodiment having two spaced, inner branches twisted with conductors having high conductivity; which are connected with vertical vertical stub cables.

FIG. 5 shows an embodiment of an electric fence, in which two spaced, horizontal branches 1 twisted with an electrical conductor 3c and 3d having high conductivity, wherein the stub cable conductors 4d are connected to both horizontal conductors 3c and 3d and extend essentially across the fence height. Also in this embodiment according to FIG. 5, the lowest branch can be provided with a ground conductor corresponding to FIG. 2. The embodiment according to FIG. 5 makes it especially possible to use stub cable conductors 4d having a relatively high specific resistance.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. An electric fence having a first group of branches running substantially horizontally and a second group of branches running substantially vertically, the first and second groups of branches being connected to each other in the form of a network, a predetermined number of the horizontal branches being constructed as conductor branches having relatively high electrical conductivity and being directly connected to a voltage-conducting post of the electric fence, and a remainder of the horizontal branches being constructed as non-conductor branches, wherein on the predetermined number of the horizontal conductor branches, vertical conductor branches (4, 4b, 4c, 4d) are electrically connected at predetermined intervals as vertical stub cables.

2. The electric fence according to claim 1, wherein only a horizontal branch (1) that is furthest away from the ground is constructed as a conductor branch (3) having high electrical conductivity, the vertical stub cable conductor branches (4) extending substantially across a fence height with sufficient spacing from the ground to maintain insulation.

3. The electric fence according to claim 1, wherein only a middle horizontal branch is constructed as a conductor branch (3b) having high electrical conductivity, the vertical stub cable conductor branches (4b, 4c) extending both toward the ground and away from the ground.

4. The electric fence according to claim 1, wherein two spaced horizontal branches (1) are each constructed as conductor branches (3c, 3d) having a high electrical conductivity, the vertical stub cable conductor branches (4d) being connected to both horizontal conductor branches (3c, 3d) and extending substantially across a height of the fence, while maintaining a sufficient distance from the ground.

5. The electric fence according to claim 2, wherein in addition a horizontal branch (1) that is near the ground is constructed as a conductor branch (3a) having a high electrical conductivity and is connected to the ground.

6. The electric fence according to claim 5, further including additional vertical conductor branches (4a), which lie between the vertical stub cable conductor branches (4), the additional vertical conductor branches having low electrical conductivity and being connected as stub cables at predetermined intervals to the grounded horizontal conductor branch (3a).

7. The electric fence according to claim 1, wherein the vertical conductor branches (4, 4a, 4b, 4c, 4d) have a substantially lower conductivity than the horizontal conductor branches.

8. The electric fence according to claim 1, wherein a specific resistance of the horizontal conductor branches (3, 3a, 3b, 3c, 3d) lies in the range of 0.1–0.5 ohm/m.

9. The electric fence according to claim 1, wherein a specific resistance of the vertical stub cable conductor branches (4, 4a, 4b, 4c, 4d) lies in a range of 1–50 ohm/m.

10. The electric fence according to claim 1, wherein the conductor branches are made of a non-conducting material provided with an electrical conductor.

11. The electric fence according to claim 9, wherein the electrical conductor is wrapped around the non-conducting material.

12. The electric fence according to claim 1, wherein the conductor branches are constructed directly as electrical conductors.

* * * * *

UNITED STATES PATENT AND TRADEMARK OFFICE
CERTIFICATE OF CORRECTION

PATENT NO.    : 6,173,942 B1
DATED         : January 16, 2001
INVENTOR(S)   : Wilhem Weinreich and Robert Muller It is certified that error appears in the above-identified patent and that said Letters Patent is hereby corrected as shown below:

<u>Title page,</u>
Item [73] Assignee should read as follows: "Horizont Gerätewerk GmbH".

Signed and Sealed this

Eighteenth Day of December, 2001

*Attest:*

JAMES E. ROGAN
*Attesting Officer*    *Director of the United States Patent and Trademark Office*